Dec. 26, 1933.    J. P. CALLAHAN    1,940,995
SIDE WINDSHIELD ATTACHING CONSTRUCTION
Filed Feb. 28, 1933
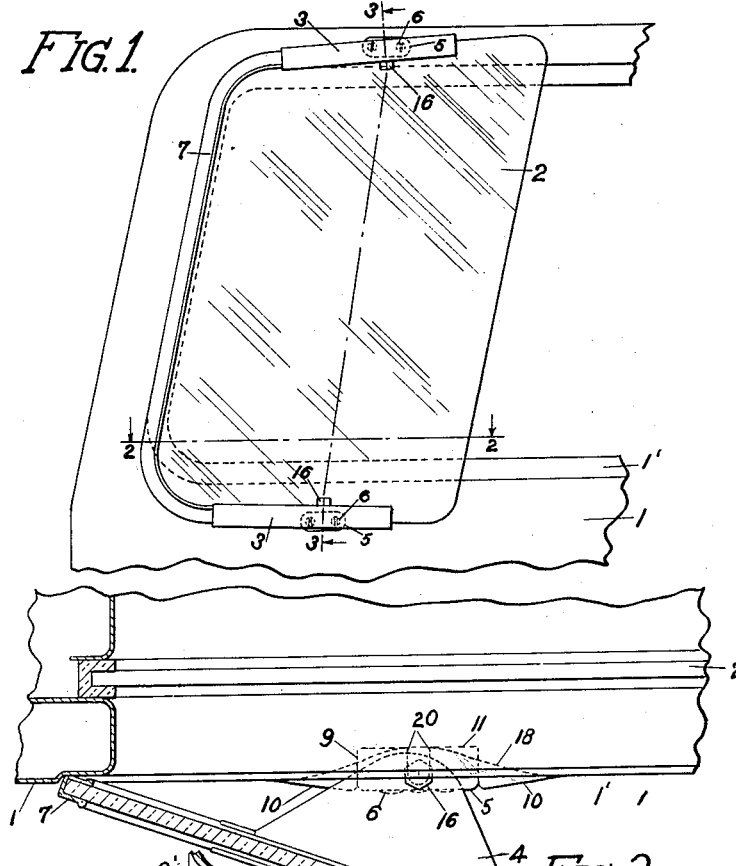
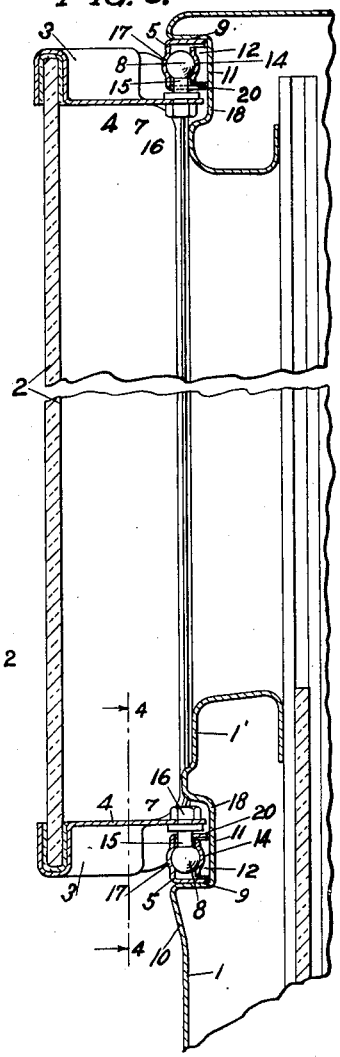
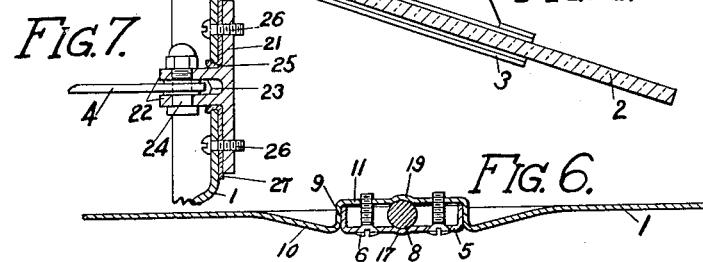
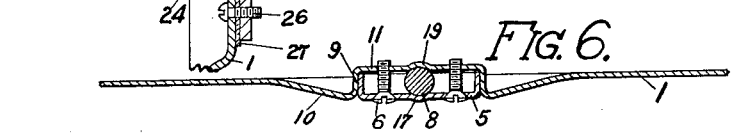
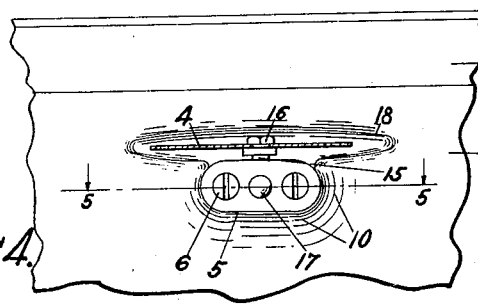
INVENTOR.
JAMES P. CALLAHAN
BY Miller, Boykin & Bried
ATTORNEYS.

Patented Dec. 26, 1933

1,940,995

UNITED STATES PATENT OFFICE 1,940,995

SIDE WINDSHIELD ATTACHING CONSTRUCTION

James P. Callahan, San Francisco, Calif.

Application February 28, 1933. Serial No. 658,927

12 Claims. (Cl. 296—84)

This invention relates to side wind shields as used on the doors and side windows of closed body automobiles, and the object of the invention is to provide a construction which will overcome all liability for the attaching brackets to become displaced as well as to provide a less obtrusive connection of the shield to the car or door than prior constructions of this kind, and also a much simpler construction. Other advantages of the invention will appear in the following description and accompanying drawing.

In the drawing Fig. 1 is a vertical elevation of the upper portion of an automobile body door showing a side wind shield in place embodying the present improvements.

Fig. 2 is an enlarged cross section of Fig. 1 as seen from the line 2—2 thereof.

Fig. 3 is an enlarged vertical section of Fig. 1 taken through the line 3—3 thereof.

Fig. 4 is a fragmentary section of Fig. 3 as seen from the line 4—4 thereof showing a front elevation of the lower attaching plates.

Fig. 5 is a horizontal section of Fig. 4 as seen from the line 5—5 thereof.

Fig. 6 is a view similar to that of Fig. 5 but showing a modified form of the invention.

Fig. 7 is a fragmentary view of a modified form of the invention using an ordinary pivot instead of a ball and socket pivot.

Before describing the invention in detail it may be stated that heretofore side wind shields have generally been attached to the outer sides of doors by means of brackets bolted or otherwise secured thereagainst, and which were both unsightly, were subject to displacement, and also interfered with cleaning of the doors close to the bracket. The present improvements include a pair of depressions in the face of the door in which the attaching plates are seated to absolutely prevent their displacement in case any of the attaching screws should become loosened. Also the metal or surrounding surface of the door is gently bulged or slanted outwardly around the depressions so that they will have a greater effective depth without interfering with the interior door mechanism or windows which slide within the hollow doors.

In the drawing 1 is the sheet metal wall of a common sheet metal automobile door or body wall adjacent a window opening on which it is desired to attach a side wind shield. The side wind shield here shown consists of a glass plate 2 mounted between upper and lower channels 3, which include a triangular flat piece 4 vertically pivoted to a pair of attaching plates 5 in turn secured to the outer side of the vehicle as by screws 6 which may be simply threaded into the metal of the door or body.

The glass plate is adapted to turn on its pivots to bring its forward edge against the vehicle side and is shod with a rubber strip 7 in the known manner.

The pivot devices used in the present invention are ball joints 8 to provide for various angular settings to which they must be adapted in use on the various designs of modern automobile windows, and while ball joints for this purpose have been previously claimed by me in my patent application Serial No. 620,743, filed July 5, 1932, in the present improvement they are set within recesses 9 formed into the door or body walls.

The recesses are best shown in Fig. 2 wherein the plain outer surface of the door or body is designated 1, and the slightly depressed molding panel surface 1' around the window opening as provided on most cars is also indicated, though sometimes this is absent. The sheet metal of the body or door gently swells outward around the attaching plates 5 as at 10 and then dropped back abruptly to form a pocket or recess 9 with a flat bottom 11 below the main plane of the outer wall of the door or body. Against the bottom 11 of this recess is secured a plate 12 as by screws or rivets 13 and which plate has formed on it a spherical depression or seat 14 for the ball 8 which is caried at the end of a shank 15 shouldered and secured to the bracket plate 4 as by a nut 16.

The outer or cooperating seat 17 for the ball is formed in plate 5 which is drawn in snugly against the ball by the screws 6 to produce any degree of friction in the joint which may be desired.

The inner seat 14 for the ball being raised outwardly from plate 12 provides a certain amount of resiliency to insure a constant working friction of the joint. It is desirable that the inner and outer ball seats as well as the ball and screws be made of stainless steel or other non-corroding metal so as to preserve the joint as well as to prevent rust marks developing on the side of the car.

In order to permit the wing to swing to any desired angle of adjustment an angular horizontally extending channel 18 is formed in the door or car side just to the inner or confronting sides of both recess or pockets to accommodate the edge of plate 4 as will be readily understood by reference to Fig. 2.

Instead of placing a separate ball seat member 12 within the recess 9 as described I may form the inner ball seat directly in the metal of bottom of the recess as shown at 19 in Fig. 6 and may or may not use a thin gasket or shim of any desired material between the ball and its seat if the condition of the seats should require.

Plate 5 is preferably made channel or box shape to insure stiffness, and to promote ease of assemblage a slot 20 is provided at one side of the channel or box to pass the shank 15 of the ball.

The modified form of the invention appearing in Fig. 7 is a vertical section taken through one of the supporting brackets which is positioned in a recess formed in a side of the automobile door or body.

This bracket incudes a plate 21 formed with a pair of spaced lugs 22 extending perpendicularly therefrom so positioned as to provide a horizontally extending slot 23 therebetween for receiving an edge of the triangular flat piece 4 of the side wings. A bolt 24 extends through the lugs and flat piece 4 adjacent an edge of the latter to secure them in assembled relation and to provide a pivot for the side wing. The side of the body is slotted or recessed at 25 within the recess 9' for projecting the lugs outwardly of the side of the body from the inside thereof and the plate 21 thus abuts the inner face of the body shell, being screwed thereto by screws 26. An insulation strip 27 of rubber, leather or fibrous material is disposed between the plate 21 and body shell around the slot to prevent ingress of rain.

It is manifest, of course, that where the upper and lower brackets of this form are on a side wing as shown in Fig. 1, the upper and lower pivots are in alignment to permit the side wing to be pivoted.

Having thus described my improved side wind shield bracket attaching construction, what I claim is:—

1. Side wind shield attaching device comprising inner and outer pivot seats positioned within a recess formed in the outer wall of the vehicle.

2. Side wind shield attaching device comprising inner and outer ball pivot seats positioned within a recess formed in the outer wall of the vehicle.

3. Side wind shield attaching device comprising inner and outer pivot seats positioned within a recess formed in the outer wall of the vehicle, the outer wall of the vehicle part in which the recess is formed bulging outwardly to the edge of the recess.

4. In a construction as specified in claim 2, the outer seat formed on a box-like plate inverted into the recess.

5. In a construction as specified in claim 2, the outer seat formed on a box-like plate inverted into the recess and secured in place by screws threaded into the bottom of the recess.

6. In combination with a side wind shield having upper and lower bracket plates with pivots thereon, means seated in recesses formed in the outer sides of the vehicle body or door frictionally embracing the pivots, and horizontally extending channels formed in the vehicle body side arranged to receive respectively said upper and lower bracket plates in adjusting the wind shield on its pivots.

7. Windshield attaching device comprising an outwardly bulged formation in the wall to which the wind shield is to be attached provided with a recess or depression therein, a pivot seat member positioned within the recess adapted to receive a pivot of the wind shield, and means for securing said member in place.

8. Windshield attaching device comprising an outwardly bulged formation in the wall to which the wind shield is to be attached provided with a recess or depression therein, a pivot seat member positioned within the recess adapted to receive a pivot of the wind shield, and means for securing said member in place, said pivot seat member taking the form of an inverted box in the recess with a ball seat formed on its bottom.

9. Windshield attaching device comprising an outwardly bulged formation in the wall to which the wind shield is to be attached provided with a recess or depression therein, a pivot seat member positioned within the recess adapted to receive a pivot of the wind shield, means for securing said member in place, said pivot seat member taking the form of an inverted box in the recess with a ball seat formed on its bottom, and a slot in the side of the box to pass the neck of a ball joint.

10. In combination with an automobile door, a side wind shield provided with separate upper and lower horizontally extending brackets terminating respectively at one edge at the outer upper and lower ends of the side wing respectively and each having pivot means adjacent the edge remote from said wind shield, said door being formed with a recess, a plate in said recess provided with means arranged and adapted for securing said pivot means thereto in a manner to permit swinging of the wind shield about said pivot means and means for tightening said plate against the pivot means for adjustably securing the windshield in the position desired against accidental swinging thereof.

11. Side wing attaching device comprising inner and outer pivot seats positioned within a recess formed in the outer wall of the vehicle, the outer seat formed on a box-like plate inverted into the recess.

12. Windshield attaching device comprising a ball pivot seat member positioned within a recess formed in the wall of a vehicle to which the windshield is to be attached, said pivot seat member being arranged and adapted to receive a ball pivot of the windshield, means for securing the ball pivot seat member in place and said seat member being adjustable for increasing or decreasing the degree of frictional resistance between the seat member and the ball pivot adapted to be seated therein.

JAMES P. CALLAHAN.